US010072642B2

(12) United States Patent
Cooke

(10) Patent No.: US 10,072,642 B2
(45) Date of Patent: Sep. 11, 2018

(54) USES OF HYDROCARBON NANORINGS

(71) Applicant: Laurence H. Cooke, Los Gatos, CA (US)

(72) Inventor: Laurence H. Cooke, Los Gatos, CA (US)

( * ) Notice: Subject to any disclaimer, the term of this patent is extended or adjusted under 35 U.S.C. 154(b) by 345 days.

(21) Appl. No.: 14/643,577

(22) Filed: Mar. 10, 2015

(65) Prior Publication Data
US 2015/0184643 A1 Jul. 2, 2015

(51) Int. Cl.
| | |
|---|---|
| *F02C 1/00* | (2006.01) |
| *F03H 3/00* | (2006.01) |
| *B64G 1/40* | (2006.01) |
| *B82Y 30/00* | (2011.01) |
| *F03H 99/00* | (2009.01) |
| *H02N 11/00* | (2006.01) |
| *H04B 13/00* | (2006.01) |

(52) U.S. Cl.
CPC ............... *F03H 3/00* (2013.01); *B64G 1/409* (2013.01); *B82Y 30/00* (2013.01); *F03H 99/00* (2013.01); *H02N 11/00* (2013.01); *H04B 13/00* (2013.01); *Y10S 977/771* (2013.01); *Y10S 977/932* (2013.01)

(58) Field of Classification Search
CPC ........... B64G 1/409; B64G 1/426; F03H 3/00; F03H 99/00
See application file for complete search history.

(56) References Cited

U.S. PATENT DOCUMENTS

| | | | | |
|---|---|---|---|---|
| 5,477,056 A | * | 12/1995 | Hirota | ...................... H05H 7/06 250/492.2 |
| 5,831,354 A | * | 11/1998 | Stopplecamp | ......... B64G 1/409 244/171.5 |
| 7,013,708 B1 | | 3/2006 | Cho et al. | |
| 7,354,877 B2 | | 4/2008 | Rosenberger et al. | |

(Continued)

OTHER PUBLICATIONS

Wang et al, "A novel one-step method to synthesize copper nitrate hydroxide nanorings" (Jun. 10, 2009).

(Continued)

*Primary Examiner* — Gerald L Sung
(74) *Attorney, Agent, or Firm* — Panitch Schwarze Belisario & Nadel LLP

(57) ABSTRACT

Hydro-carbon nanorings may be used, e.g., in power storage power transmission and transportation. Sufficiently cooled, an externally hydrogen doped carbon nanoring may be used to create a radial dipole containment field for electrons rotating in the nanoring. Such nanorings may transmit DC current with little or no loss. Similarly, an internally hydrogen doped carbon nanoring may be used to create a radial dipole containment field for positrons rotating in the nanoring. Virtually lossless transmission of AC current may be achieved by pairing such streams of electrons and positrons in their respective containment fields. Closed rotation of such streams may also be used to efficiently store large amounts of electrical energy. Finally, selectively accelerating and decelerating pairs of such paired electron and positron streams, which are moving at relativistic speeds, differential momentum may be created to cause physical movement.

7 Claims, 13 Drawing Sheets

(56) References Cited

U.S. PATENT DOCUMENTS

| | | | |
|---|---|---|---|
| 7,446,636 B1* | 11/2008 | Below | B64C 39/001 244/1 R |
| 7,531,892 B2 | 5/2009 | Pfefferle et al. | |
| 2002/0172820 A1 | 11/2002 | Majumdar et al. | |
| 2005/0056729 A1* | 3/2005 | Foster | F03H 99/00 244/171.1 |
| 2005/0064185 A1 | 3/2005 | Buretea et al. | |
| 2006/0070868 A1 | 4/2006 | Fan et al. | |
| 2006/0257637 A1 | 11/2006 | Pereira et al. | |
| 2009/0017363 A1 | 1/2009 | Niu et al. | |
| 2009/0207486 A1 | 8/2009 | Burov et al. | |
| 2009/0267647 A1 | 10/2009 | Kim et al. | |
| 2012/0117937 A1 | 5/2012 | Cooke | |
| 2014/0009098 A1* | 1/2014 | Banduric | B64G 1/409 318/558 |

OTHER PUBLICATIONS

Cho et al, "Designing PbSe Nanowires and Nanorings through Oriented Attachment of Nanoparticles" (Jan. 7, 2005).
Rani et al, "Structural and Nonlinear Optical Properties of Self-Assembled SnO2-Doped Silicon Nanorings Formed by Pulsed Laser Ablation" (May 19, 2008).
Yen-Wen Lin, Tzong-Ming Wu, "Synthesis and characterization of externally doped sulfonated polyaniline/multi-walled carbon nanotube composites" (Aug. 6, 2009).
Office Action dated Feb. 18, 2014 in U.S. Appl. No. 12/946,052.
Office Action dated Jul. 31, 2014 in U.S. Appl. No. 12/946,052.

* cited by examiner

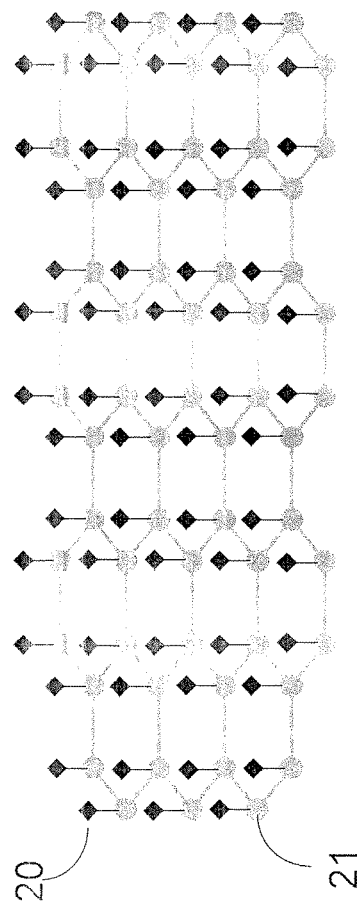
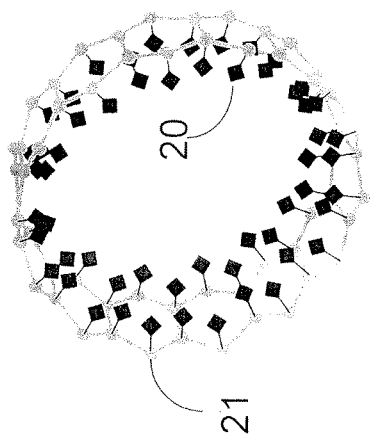
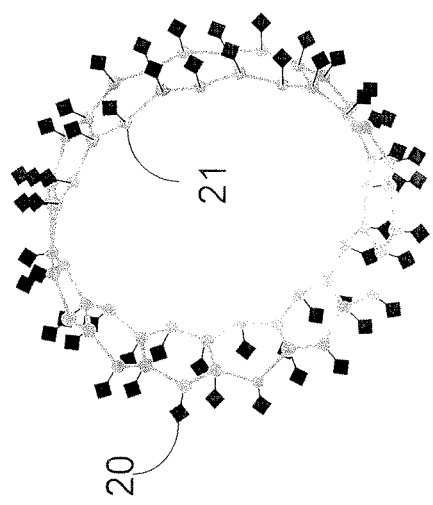
Figure 2a
Figure 2b
Figure 2c

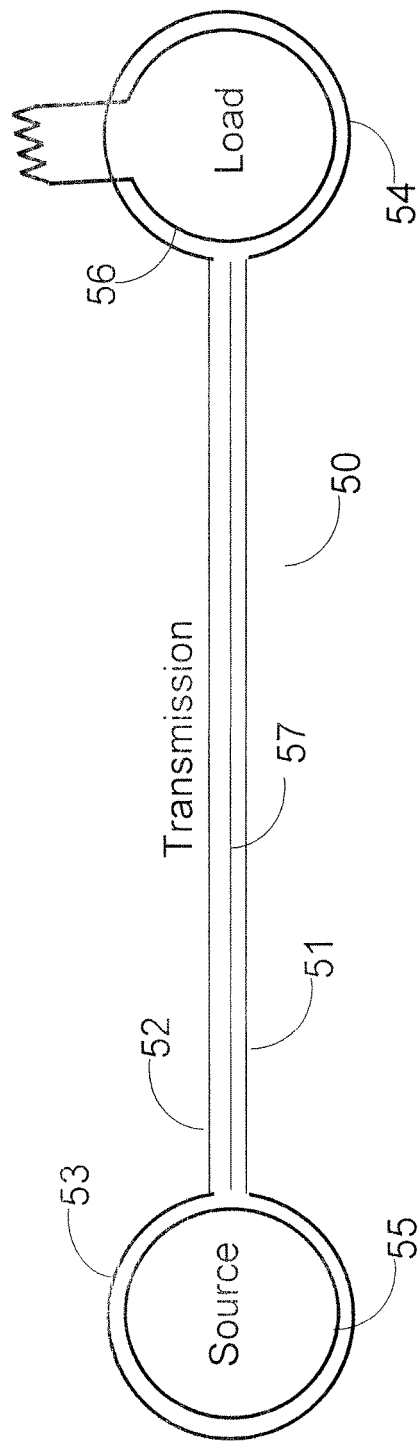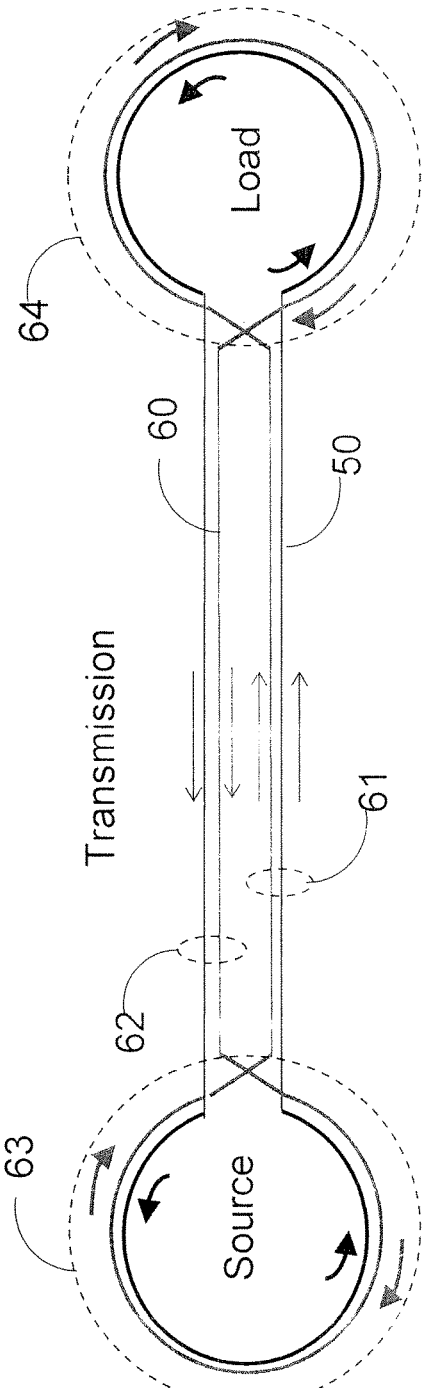
Figure 5
Figure 6

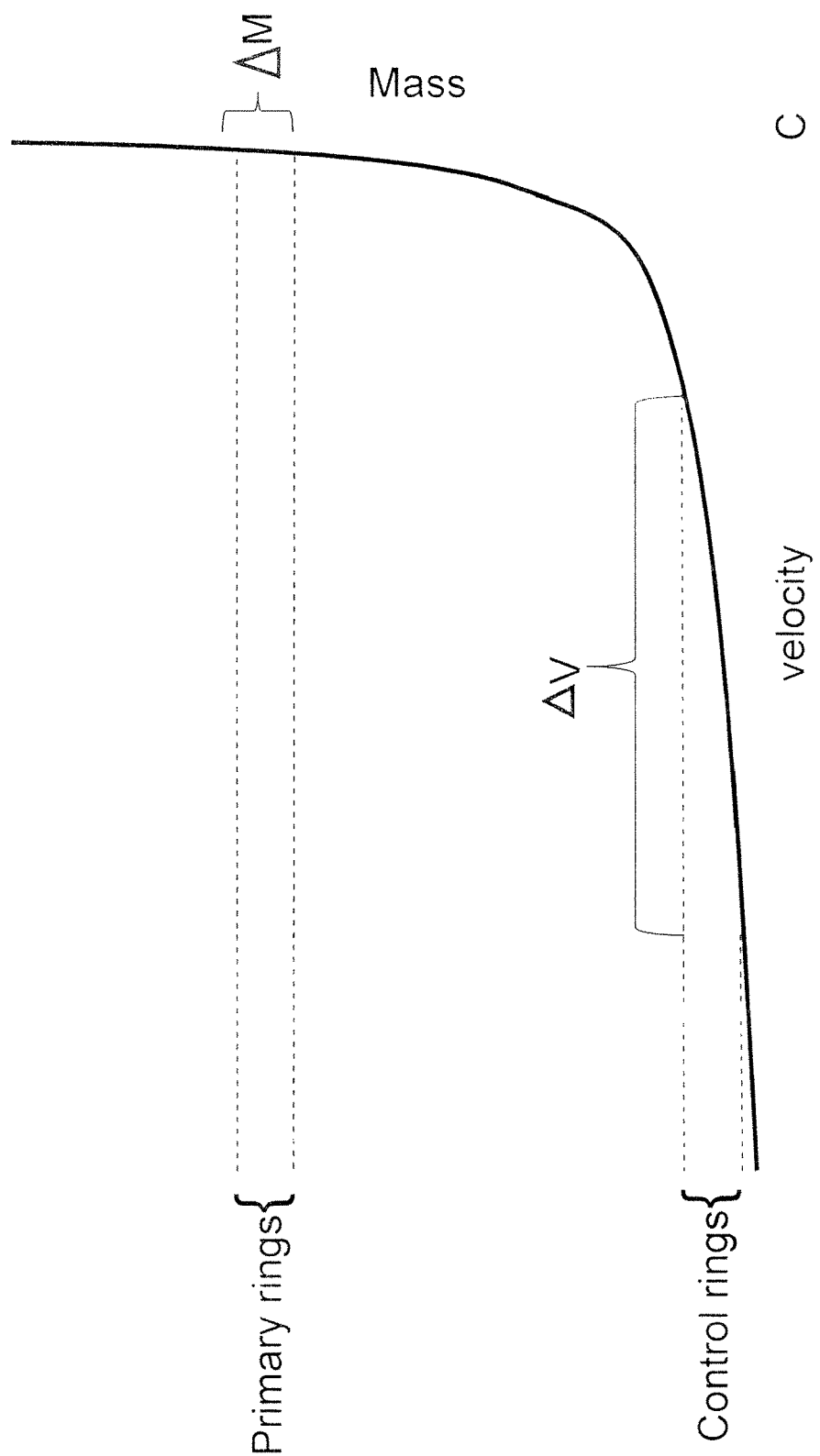

US 10,072,642 B2

USES OF HYDROCARBON NANORINGS

CROSS-REFERENCE TO RELATED APPLICATION

This application is a divisional application of U.S. patent application Ser. No. 12/946,052, filed Nov. 15, 2010, which is incorporated herein by reference.

BACKGROUND OF THE INVENTION

Traditional electrical devices make use of moving charges called current in an otherwise electrically neutral conductive medium, and the energy contained in each measure of those moving charges, called voltage, transports energy from its source to its destination or load. Usually this current is in the form of electrons, but it can be in the form of holes in semiconductors, or ions in uses such as welding or etching. This form of electrical energy, which is easily generated, is lossy due to resistance and electromagnetic radiation.

Recently researchers have found graphene and carbon nanotube structures have superconducting properties at reasonably high cryogenic temperatures. Nanotube structures composed of Boron doped Magnesium as described by Pfefferle, et al. in U.S. Pat. No. 7,531,892 granted May 12, 2009, may superconduct up to temperatures of 100 degrees K. Furthermore, carbon nanotube structures are becoming more manufacturable, as describer by Rosenberger, et. al. in U.S. Pat. No. 7,354,977 granted Apr. 8, 2008.

While, the applications of high temperature superconducting structures are endless, embodiments within this disclosure will focus primarily on novel forms of electricity for power transmission, energy storage, and physical transportation using hydrogen doped carbon nanorings, nanotubes connected to form a ring.

SUMMARY OF THE INVENTION

A nanoring is a nanotube that is connected at its ends to form a tubular ring. One type of nanotube has a single layer of hexagonally connected carbon atoms, as if a portion of a sheet of hexagonally connected carbon atoms was rolled into a tube. Such a structure is 10 shown in FIG. 1a. Every carbon atom 11 has four bonds with neighboring carbon atoms, two are single bonds 12, and one is a double bond 13. Each double bond may be broken and replaced by a pair of carbon-hydrogen bonds, where the hydrogen is physically on one side of the sheet as shown in FIG. 2a. If the same were done with the outside of a carbon nanotube, as shown in FIG. 2b, the positions of the electrons relative to the hydrogen protons in the structure creates a negative radial dipole field in the middle of the tube.

If a sufficient number of electrons are inserted into the center of such a nanoring, they may form a string of unbound electrons under continuous repulsive tension between each other and the electrons in the walls of the nanoring. The electrons are held in the cross-sectional center of the ring by the negative dipole field created by the relative placement of the electrons around each carbon atom and the hydrogen's electron in its carbon bond. Each free electron down the cross-sectional center of the ring is also repulsed by the electrons in front and in back of it down the tubular center of the ring. A current may be generated by inductive coupling, which has no resistance, even at relatively high temperatures compared to traditional superconductors.

In one embodiment of the present invention, a generator source induces a circular current at one end of such a ring, which proceeds in both directions down the pair of tubes that make up the ring, to the other end, where the electrical energy is extracted by transformer like inductive coupling to be used in at traditional electric load.

In another embodiment of the present invention the circular source and load ends of the transmission line may be aligned on top of each other with intervening rings connected together to form a single resistive conductor, such that electric power may be stored in the form of a magnetic field, and removed by placing a load on the resistive conductor.

In yet another embodiment of the present invention, a second carbon nanoring with hydrogen attached to each carbon atom inside the ring, is injected with positrons, of equivalent density as the electrons in first ring. By putting these rings adjacent to each other between the generator and load, virtually all electro-magnetic emissions are eliminated. By twisting one of the pair of rings at both ends of the transmission, the current induced at one end, appears to cancel through the transmission, to reappear at the other end of the rings. In this fashion the electrical energy is transmitted without any loss.

Similarly, another embodiment of the present invention the circular source and load ends of the electron and positron lines may be aligned on top of each other with intervening rings connected together to form a single resistive conductor, such that electric power may be stored in the form of the relativistic mass increases of the electron and positron streams, and removed by placing a load on the resistive conductor.

Noting that accelerating the electron and positron streams increases their relativistic mass and decelerating the streams decreases their relativistic mass, in yet another embodiment, a propulsion mechanism e.g. within an apparatus or craft containing multiple pairs of streams of positrons and electrons moving at relativistic speeds, may be induced by continuously accelerating the streams down one side of a set of oval shaped nanorings, and decelerating the streams up the other side. The difference in moving relativistic mass creates net momentum that is continuously transferred from one end of the ovals to the other, resulting in the movement of the craft.

In yet another embodiment of this invention, the power obtained by electrical coupling from the decelerating end of the oval is continuously transferred via a control loop to the accelerating end without a corresponding transfer of momentum.

In another embodiment energy that is induced into or extracted out of the control loop by electrical coupling to existing electrical sources is converted into a corresponding increase or decrease of differential momentum thereby changing the movement of the craft.

In another embodiment the energy induced into the control loop to move the craft is obtained by extracting energy out of the streams of electrons and the streams of positrons by annihilating of some of the positrons and the electrons.

In yet another embodiment, the streams of electrons and the streams of positrons are accelerated to near the speed of light by issuing sets of opposing polarity pulses into the control loop with increasing frequency in synchronization with the speed of the streams.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2a is a diagram of a hydrogen doped sheet of graphene,

FIG. 2b is a diagram of a slice of an exterior doped nanoring,

FIG. 2c is a diagram of a slice of an interior doped nanoring,

FIG. 5 is a simplified diagram of structure for transmitting electricity,

FIG. 6 is another diagram of a structure for transmitting electricity,

FIG. 16 is a graph of $1/(1-V^2/C^2)^{1/2}$ with control primary rings.

DETAILED DESCRIPTION OF THE PREFERRED EMBODIMENTS

Figure 1B:
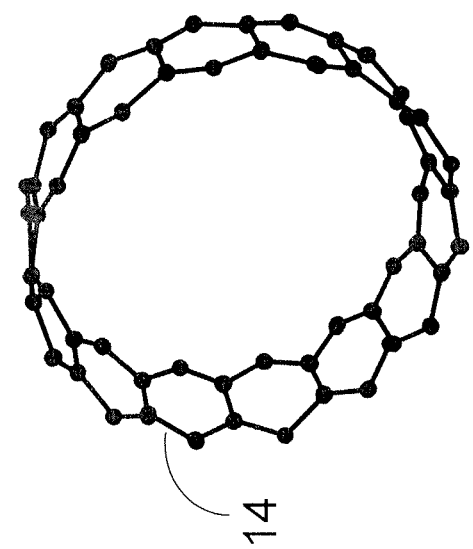
FIG. 1b is a diagram of a slice of a single walled nanoring.
Figure 1A:
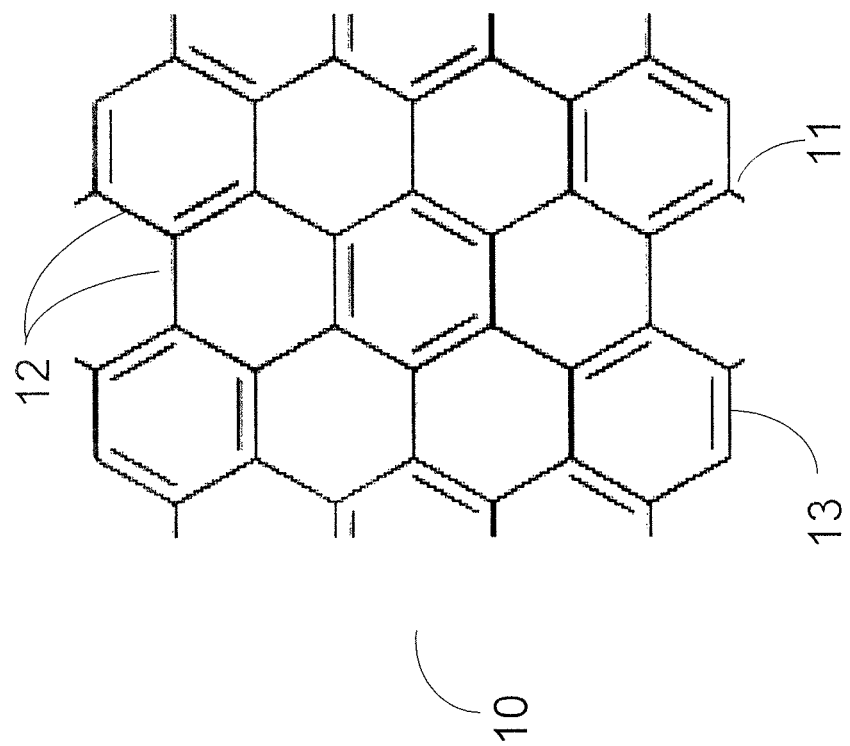
FIG. 1a is a diagram of a sheet of graphene.

Reference is made to FIG. 1b, a diagram of a slice of a single walled nanoring. If this slice 14 was replicated, it would form a tube of interlocked carbon atoms. A nanoring is such a tube where the ends are connected together to form a ring. Normally some bonds between the carbon atoms in a nanoring are double bonds. If a nanoring's surface was unrolled it would form a sheet of hexagonal graphene with some double bonds 13 as shown in FIG. 1a.

Reference is now made to FIG. 2a, a diagram of a flattened sheet of graphene doped on one side. It is comprised of carbon atoms 21, which are each connected to three other carbon atoms and a hydrogen atom 20. Reference is now made to FIG. 2b, a diagram of a slice of an exterior doped nanoring. This is diagrammatically equivalent to rolling up the hydrogen doped graphene such that the hydrogen atoms 20 are on the outside of carbon atoms 21 of a normal nanoring.

Figure 3:
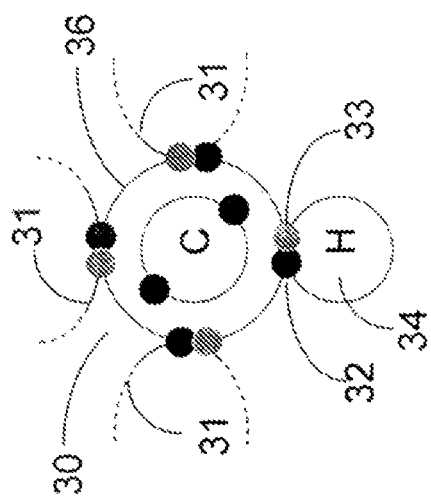
FIG. 3 is a diagram of a Hydrogen atom bonded to a Carbon nanoring atom.

Now let's look at the atomic structure of such a doped nanoring. Reference is now made to FIG. 3, a diagram of a Hydrogen atom bonded to a Carbon nanoring atom. Each carbon atom 30 is connected via a pair of electrons, to three adjacent carbon atoms 31. The fourth electron in the outer electron shell 32 is paired with a hydrogen electron 33, with the hydrogen's nucleus, a proton 34, placed outside the shell of the ring. Therefore the hydrogen's electron, within some random tolerance, is between the carbon's nucleus 36, in the shell of the nanoring, and the hydrogen's nucleus 34, outside the ring. The rest of the electrons between the carbon atoms are within the nanotube shell along with the carbon nuclei and their electrical charges cancel with the charges of the nuclei. As a result, they have no significant effect on an electron in the middle of the nanoring.

On the other hand, the hydrogen protons and electrons form many electrical dipoles evenly spaced just outside of the neutral shell of the nanoring, with each of the hydrogen's electron between its proton and the carbon in the shell of the nanoring. It should be understood, that other alkali metals such as lithium or sodium may be as good, or even better than Hydrogen, in this structure.

Figure 4:
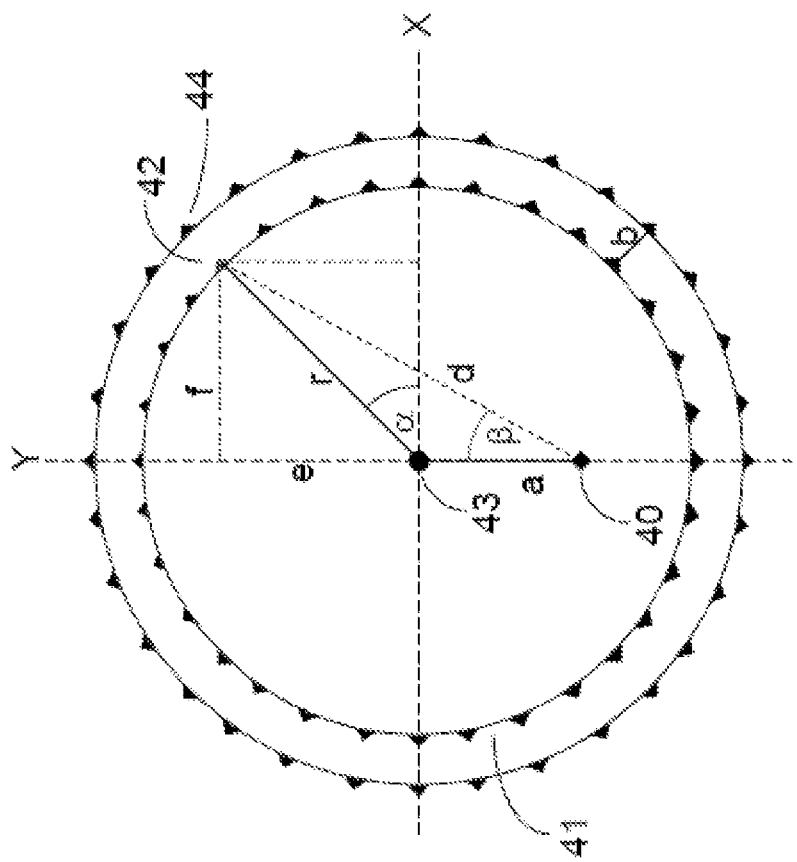
FIG. 4 is a cross-sectional schematic of a doped single walled nanoring.

Given this structure let's look at the forces on an electron in the middle of the circle. Reference is now made to FIG. 4, a cross-sectional schematic of a doped single walled nanoring. If an electron is at point 40 within a circle of fixed electrons 41, the force on the electron is the sum of $q^2/d^2$ for each electron 42 about the parameter of the circle. The field at the point 40 is the sum of $q/d^2$ where q are the charges and d are the distances of the electrons about the ring, from the point 40. Clearly at a point 40, the force in the X direction is symmetric and therefore zero. This leaves the force in the Y direction. Now there are N electrons in the circle 41, each at angles that are $2\pi/n$ apart from each other. The field produced by those electrons is $$E = -\sum q/d^2, \text{ but in the } Y \text{ direction it is } =$$

$$-\sum q*\sin(\beta)/d^2 = -\sum q(r*\sin(\alpha)+a)/d^3 \text{ because } \sin(\beta) =$$

$$(a+e)/d = (r*\sin(\alpha)+a)/d.$$

$$\text{Now } d^2 = f^2 + (a+e)^2 \text{ so}$$

$$E = -\sum q[r*\sin(\alpha)+a]/[(r*\sin(\alpha))^2 + (r*\cos(\alpha))^2]^{1.5} \ i*2\pi/n$$

$$\text{and } i = \text{for } \alpha = 0 \text{ to } n-1,$$

$$\text{or } = -\sum q[r*\sin(\alpha)+a]/[2ar*\sin(\alpha)+a^2+r^2]^{1.5} =$$

$$-q\sum [r*\sin(\alpha)+a]/[2ar*\sin(\alpha)+a^2+r^2]^{1.5}$$

Clearly at point 43 the force is 0, because a=0 and $\Sigma \sin(\alpha)=0$, but for all other locations the field pushes the charge toward the center. The protons 44 are outside of their electrons 43 in the dipole. The protons charges create a field of attraction that, to the first order, pulls a electron in the center of the ring toward the edge of the ring by $F=-q^2/(r+b)^2$ where b is the distance between the dipole charges, but the Hydrogen's electron pushes the electron away with a force $F=q^2/r^2$ so the net field is $E=q[1/r^2-1/(r+d)^2]$, a dipole field that is the sum of the two fields.

More specifically, the distance of a hydrogen-carbon bond is ~109 picometers. It is therefore reasonable to assume ~54 picometers between the proton and electron of the hydrogen atom on the inside wall of a 256 hexagonal carbon linked tube, which would be about 10 nanometers in radius. This nanotube's dipole electric field is sufficient to keep an electron moving within the nanotube as long as the tube is not bent too tightly. Furthermore as the electron's velocity approaches the speed of light, its effective mass and charge perpendicular to its direction of travel both grow as $1/(1-v^2/c^2)^{1/2}$ where c is the speed of light. This effectively cancels the centripetal force up to the bonding energy of the nanotube.

Inserting electrons into such a structure may be accomplished by charging the nanoring while surrounding it with a constant magnetic field. Charging the nanoring will drive excess electrons into the center of the ring. While the ring is under a magnetic field, the excess electrons will flow around the ring accelerating until the magnetic field is canceled. Clearly, each additional electron in the tube forces the rest of the electrons to redistribute such that they are equally spaced around the ring. As such, each electron reduces the distance between the electrons in the circulating stream, thereby requiring an increasing voltage (or electrical force) to insert subsequent electrons into the ring. The force to insert another electron into a ring of electrons equally spaced apart is $q^2(n+1)^2/d^2$, where q is the charge of the electrons, d is the length of the nanoring, and n is the number of electrons in the ring. Clearly, the voltage goes no by the square of the inserted charge. Given a low enough temperature, the stream of electrons, which is not bound by the individual atoms in the structure, should move around the ring without resistance. Furthermore, once the electrons are circulating in the ring they should stay in the ring unless external electrical fields are strong enough to dislodge them.

As with other superconducting structures, the free electrons in the tube may form cooper pairs, which would collapse the spacing between the charges because the force of $2q/R^2$ is twice the force between cooper pairs which is $4q/(2R)^2=q/R^2$, where R is the distance between the electrons. In other words it is likely that when cooper pairs form, it will require less voltage to insert subsequent electrons into the ring, until the ring is filled with cooper pairs.

Reference is now made to FIG. 5, a simplified diagram of an exemplary structure for transmitting electricity, according to an embodiment of the invention. The nanoring 50 may be organized as a pair of straight nanotubes 51 and 52, whose current moves in opposite directions, between two nearly circular arcs 53 and 54, one of which is inductively coupled to a power source 55, and the other of which is inductively coupled to a load 56. The power is transmitted by the difference in the induced voltages in the pair of straight nanotubes 51 and 52. Normally opposing currents in two parallel wires cause the pair of wires to repel with a force of $F=I^2d/c^2r$, where I is the current in the loop, r is the distance between the pair of wires and d is the length they are placed in parallel to each other. On the other hand with nanotubes 51 and 52, this repulsive three is much larger because all the current is in the movement of the excess charge. Therefore, regardless of the direction of the current, the only force is a repulsive force due to the electrons charge. The force between two wires containing equal stationary electrostatic charges is $F=-q^2/dr$, where q is the charge in each of two wires that are parallel for a distance of d with a separation of r. Given similar charges, distances and separation between the straight nanotubes 51 or 52, they would have a similar repulsive force between them, but they would also have a relativistic electrostatic effect (similar to magnetism) added or subtracted from the stationary electrostatic charge depending on the relative directions the charges are moving. In other words, if the streams of current are moving in opposite directions, the actual repulsive force is $F=-q^2/dr(1-4\ v^2/c^2)$, where v is the velocity of the electrons, or given $I=qv/d$, the force is $F=-I^2d/[v^2(1-4\ v^2/c^2)r]$.

Clearly the repulsive forces between the two electron streams in the two nanotubes 51 and 52 may be controlled so they do not of the dipole field which keeps the electrons in the nanoring. Furthermore, as the currents increase the repulsive force between the nanotubes 51 and 52 increases by the relativistic factor $1/(1-4\ v^2/c^2)$. In other words there is a maximum current carrying capacity for any given distance separating the two nanotubes 51 and 52. This limit may be increased by separating the nanotubes, or shielding their electrostatic charge with a correspondingly positively charged conductor 57 between the pair nanotubes.

Similar to other superconducting structures, this nanoring should transmit a constant amount of power without any resistive losses characteristic of normal transmission lines. On the other hand, changes in the load 56 may result in changes of the current flowing down the pair of nanotubes 51 and 52, creating electromagnetic losses. Shortening the distance between the nanotubes 51 and 52 should help cancel the opposing differential waveforms on the pair of nanotubes, caused by the changes in the source 55 generation or load 56 demand, which would greatly reduce the electromagnetic losses, but it would also significantly reduce the power carrying capacity of the nanotubes.

Alternatively, these electromagnetic losses may be eliminated by placing a similarly doped but physically different nanoring with opposite charges next to the existing nanoring 50, such that their currents cancel between the source and load.

Reference is now made to FIG. 2c, a diagram of a slice of an interior doped nanoring. This structure should result in the positively charged proton of the hydrogen to be physically inside of its corresponding electron, producing an equivalent but oppositely charged dipole field in the center of the nanoring, such that a stream of positrons may remain contained within the nanoring. As was the case with the exterior doped nanoring it should be understood, that other alkali metals such as lithium or sodium may replace the Hydrogen, in this structure.

Reference is now made to FIG. 6, which shoes another diagram of a structure of an embodiment of the invention that may be used for transmitting electricity. In this case the interior doped nanoring 60, containing positrons is placed adjacent to the exterior doped nanoring containing electrons. By twisting the source and load ends 63 and 64 of the positron filled nanoring, the current at the ends is double the current in each nanoring, because equal but oppositely moving streams of electrons and positrons are moving through the ends of their respective nanorings. On the other hand, in each of the sections between the ends, the pairs of nanorings 61 and 62 contain equal currents moving in the same direction, which cancel because they are of comprised of oppositely charged particles. Furthermore, by keeping the oppositely charged nanorings relatively close together, any differences caused during changes in the load or source cancel, because the streams of electrons and positrons are electro-statically coupled together. As a result all losses in transmission between the source and load are eliminated.

Positrons may be created for Positron Emission Tomography by bombarding hydrogen into Oxygen, with an atomic weight of 17, or Oxygen-17, producing a radioactive isotope Fluorine-18, which decays into a positron and Oxygen-18. Alternatively bombarding hydrogen into Oxygen-16 produces Nitrogen-13 and an alpha particle, Helium. The Nitrogen-13, has a ten minute half life, breaking down into Carbon-13 and a positron. By injecting protons into an interior doped nanoring with such embedded Nitrogen, while under a sufficiently strong enough magnetic field to move the subsequently created positrons, they will enter the interior of the nanoring and will continue to move down the nanoring while other non-reacting protons may attach to available sites on the newly created carbon-13 in the nanoring. To enhance this process, the nanoring may be initially charged. Once injected with positrons the radial dipole field should continue to contain the positrons.

Figure 10:
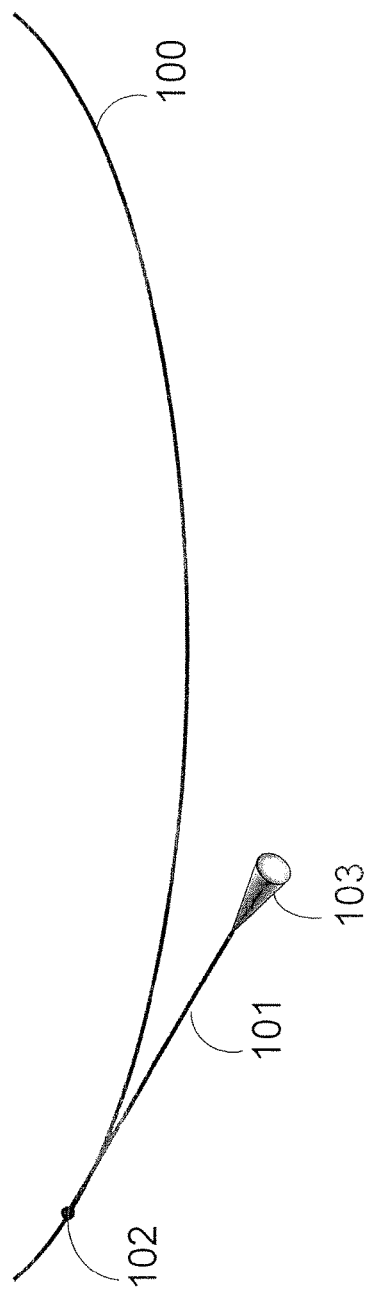
FIG. 10 is a diagram of a structure for inserting positrons into nanorings.

Alternatively, with the proper structure such as shown in FIG. 10, the positrons may be created separately by Flourine-18 decay, and may be injected into the rings via an injection cone 103 attached to an injection tube 101 that may be attached via a bud 102, tangentially to the curved portion of the nanorings 100, as shown in FIG. 10. These injection tubes 101 may be constructed in the same fashion as the nanorings 100. The positrons may be accelerated into the rings with sufficient energy to begin moving them through the ring.

It is further suspected, but not known, that the positrons may form pairs in a manner corresponding to electrons forming cooper pairs, increasing their density in a manner similar to and under similar but oppositely charged conditions as electrons.

Figure 7:
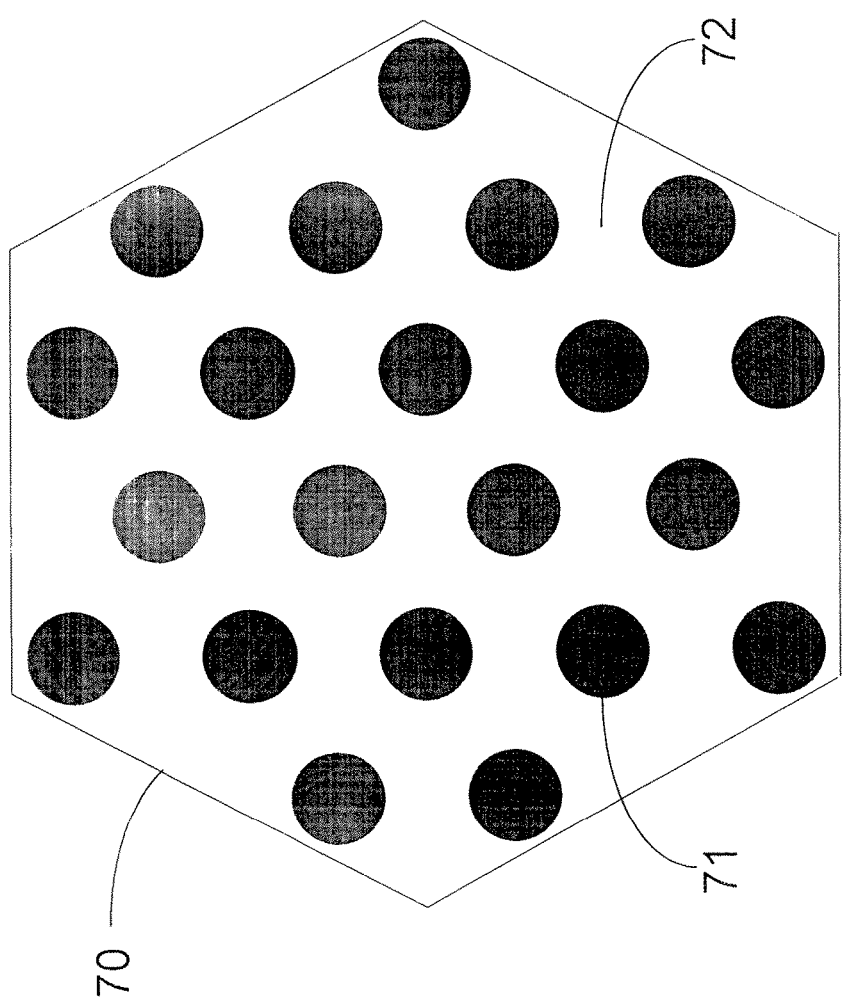
FIG. 7 is a diagram of a placement of multiple nanorings.

It is further contemplated that multiple nanorings of both types may be combined together to form a larger lossless electrical transmission cable. Reference is now made to FIG. 7, a diagram of a placement of such multiple nanorings. In this case the hexagonal cable 70 is composed of an equal number of nanorings 71 containing electrons and nanorings 72 containing positrons, in an interleaved hexagonal structure to balance the attractive forces between the electron and positron nanorings.

Figure 8:
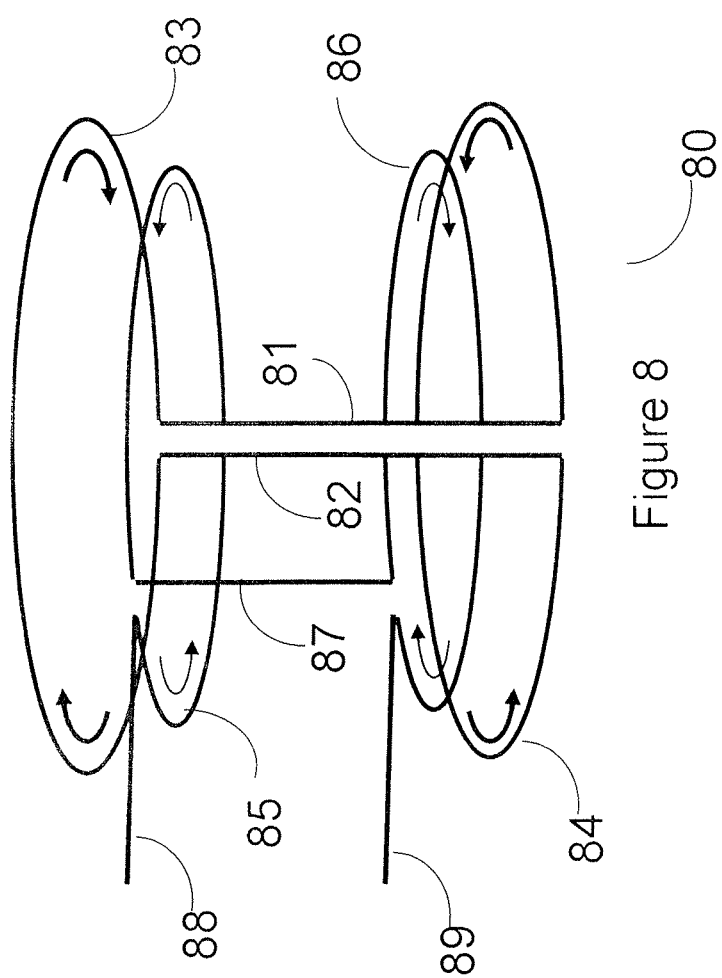
FIG. 8 is a diagram of a structure for storing electricity.

Reference is now made to FIG. 8, a simplified diagram of structure for storing electricity. The nanoring 80 consists of a pair of vertical nanotubes 81 and 82, connecting to two nearly circular arcs 83 and 84 to form a ring, where each arc is inductively coupled to a corresponding resistive conductor arc, 83 to 85 and 84 to 86. Both of the resistive conductor arcs are connected together with a vertical conductor 87 to form a single conductive line. The nanoring's arcs 83 and 84 have equal currents that move in opposite directions, externally canceling their magnetic fields. The stored power in the superconducting current circulating in the nanoring is observed as a voltage potential between the terminals 88 and 89 of the resistive conductor. By generating an overriding current on the resistive conductor, electric energy may be added to the storage element, and by applying a load across the resistive conductors terminals 88 and 89, energy may be drawn from the storage element. It is also contemplated that tire arcs 83,84 may consist of equal multiple loops of a first count and arcs 85 and 86 may consist of equal multiple loops of a second count.

Figure 9:
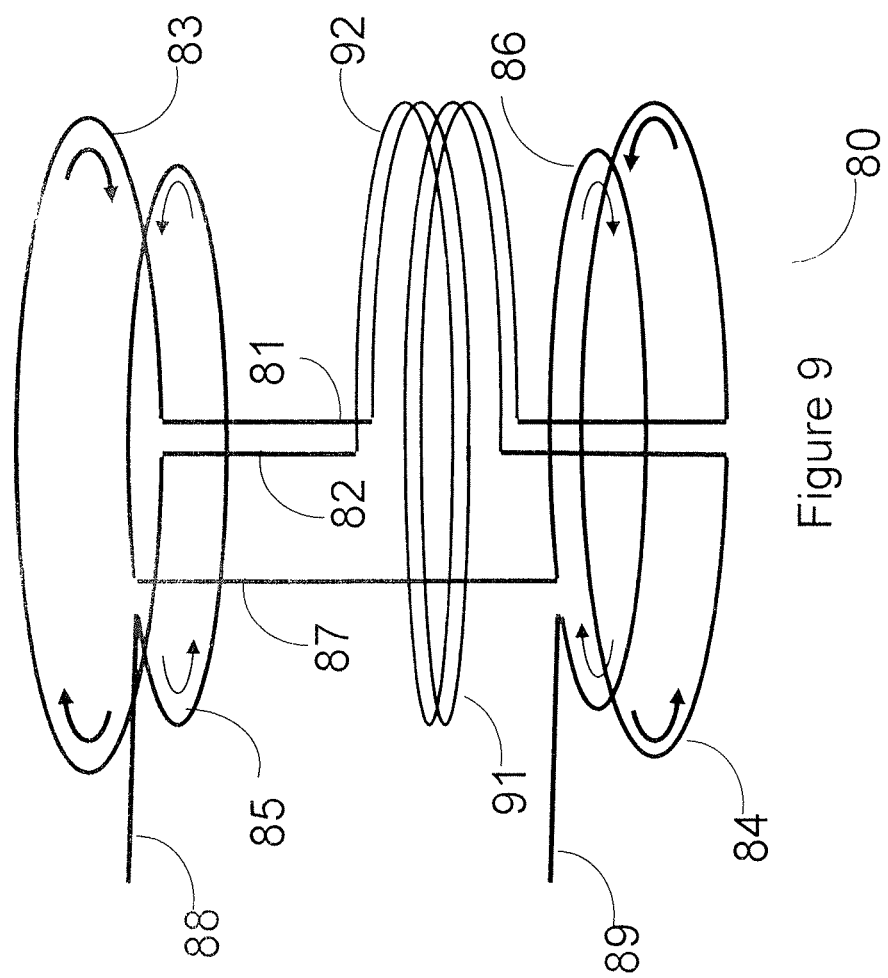
FIG. 9 is another diagram of a structure for storing electricity.

Reference is now made to FIG. 9, another diagram of a structure for storing electricity. In this case the vertical nanotubes 81 and 82 have been extended with coiled rings 91 and 92. It is further contemplated that a positively charged separator may exist between nanotubes 81 and 82, including their coils 91 and 92, in a manner similar to how 57 separates 51 and 52 in FIG. 5.

It is further contemplated that the transmission structure shown in FIG. 6 may also be folded to form a storage element similar to that shown in FIG. 9, with equal electron and positron nanoring loops.

Such a structure has no apparent magnetic field except at the twisted ends of the structure, yet it can contain a large amount of energy in the form of relativistic mass of the electrons and positrons. In normal conductors the moving electrons appear stronger by a factor of $(1-V^2/C^2)^{1/2}$, due to the Lorentz contraction. This results in a corresponding magnetic force, but the force is cancelled in the transmission structure shown in FIG. 6. On the other hand, Einstein's theory of relativity suggests the mass of the electrons and positrons are increased by an amount proportional to the Lorentz contraction. In other words the electrical energy is stored in the relativistic mass increase of the electrons and positions, a near perfect energy storage mechanism.

This leads into another use of hydro-carbon nanorings, translation of relativistic rotational energy into translational movement, which may be used e.g., to propel it craft. A plurality of pairs of streams of positrons and electrons embedded in adjacent appropriately structured oval nanorings, organized in a manner similar to the transmission lines of FIG. 6, but without the twists, which may be referred to as primary rings 110, as may be seen in FIG. 11. When accelerated to the same relativistic speeds, in the same direction, the electric fields of the equivalent streams of electrons and positrons will cancel, thus maintaining their combined momentum while minimizing any energy losses. If at least four such streams and rings exist, two in each direction, then both pairs of rings may be accelerated from the same point at one end of the cylinder with equal but opposite force and decelerated at the same points on the opposite end of their rings at the other end of the oval or cylinder.

These nanorings also have the characteristic of being superconducting when brought down to a sufficiently low temperature, which means when a superconducting nanoring is subjected to an external magnetic field, electrons will move forming a circular current about the ring to cancel the external magnetic field. Furthermore two sufficiently adjacent electron currents going in opposite directions may cancel their magnetic fields, which by this magnetic coupling may cancel their differential momentum. As a result superconducting nanorings may be used as superconducting transmission lines to transfer the energy from one end of the craft to the other.

Figure 11:
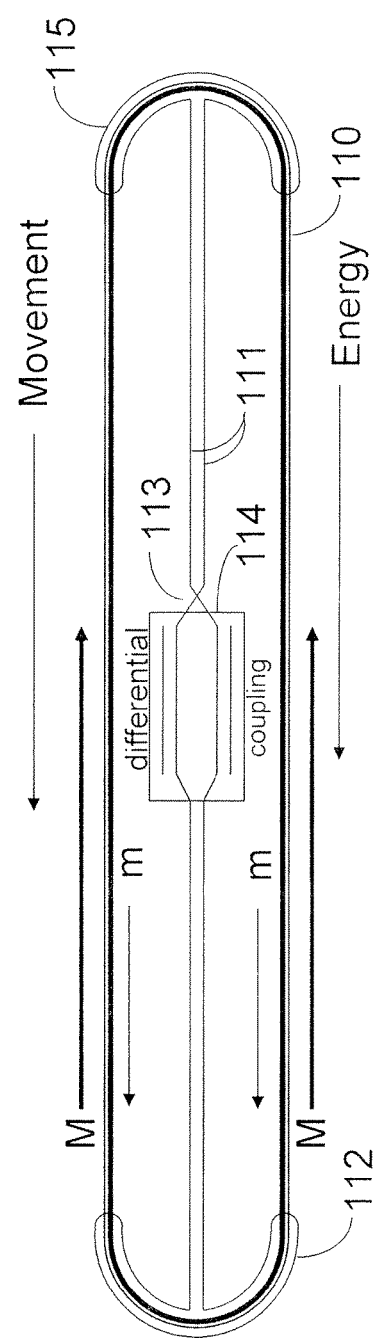
FIG. 11 is a diagram of oval nanorings for inducing movement in a craft.

In one embodiment these transmission lines may be composed of nanorings carrying streams of electrons. For brevity we will call these transmission lines the control loop 111 as shown in FIG. 11. The energy transferred on the control loop may be used to accelerate the electron and positron streams in the primary rings at one end and decelerate the electron and positron streams at the other end by coupling the control loops to the primary rings at both ends 112 and 115, but in opposite directions, which is accomplished by twisting the control loop 113 somewhere between the coupled ends 112 and 115.

To initiate movement in the apparatus of FIG. 11, additional energy may be imparted into or extracted from the control loop 111, which shifts the energy from one end to the other end. This may be done by coupling both, sides of the control loop to non-superconducting lines 114, which are controlled by traditional switching electronics. Because of the twist 113, one end of the control loop 112 imparts energy to the primary rings while the other end of the control loop 115 extracts energy from the primary rings. The differential coupling 114 in the center, retards, increases or changes the direction of the energy flowing between the two ends 112 and 115 of the control loop.

Figure 12:
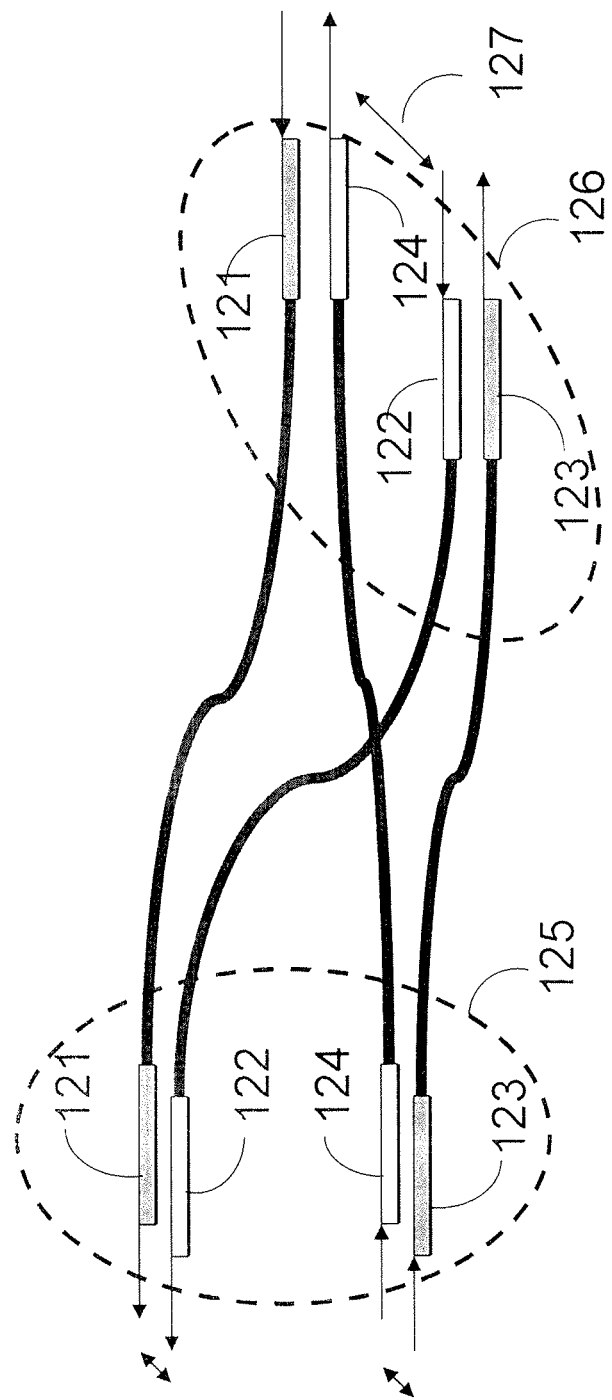
FIG. 12 is a diagram of the transition between the straight and curved positions of the oval nanorings.

In an actual system there may be as many control loops as needed to transfer the energy into and out of the primary rings, and as many primary rings as needed to transfer an adequate amount of relativistic mass to cause motion of the apparatus. As was described above, the control loops are superconducting transmission lines transferring energy between the ends of the oval primary rings, where the ratio of the number of control loops to each primary ring acts like a superconducting DC transformer at each end of the craft. This ratio determines the force or voltage with which the energy is transferred into or out of the primary rings. The pairs of primary rings may be re-oriented or grouped to transfer the control loop's energy into or out of the primary rings. FIG. 12 shows an example of one such re-orientation. Along the straight portion of the primary rings 125, the streams of positrons 122 and 124 are more closely coupled with the streams of electrons, respectively 121 and 123, moving in the same direction. The streams in one pan 121 and 122 are moving in the opposite direction to the streams in the other pair 123 and 124. This cancels their electrical fields, smoothes out the differences in their current densities, and cancels any electro-magnetic radiation which would otherwise occur during changes in the velocities of the streams. Around the curved portion of the primary rings 126, the streams of positrons 122 and 124 are more closely coupled with the streams of electrons, respectively 123 and 121, moving in the opposite directions. These pairs of primary rings 126 appear to be two oppositely flowing currents, which combined create a large magnetic field 127 and a corresponding force between them.

Figure 13:
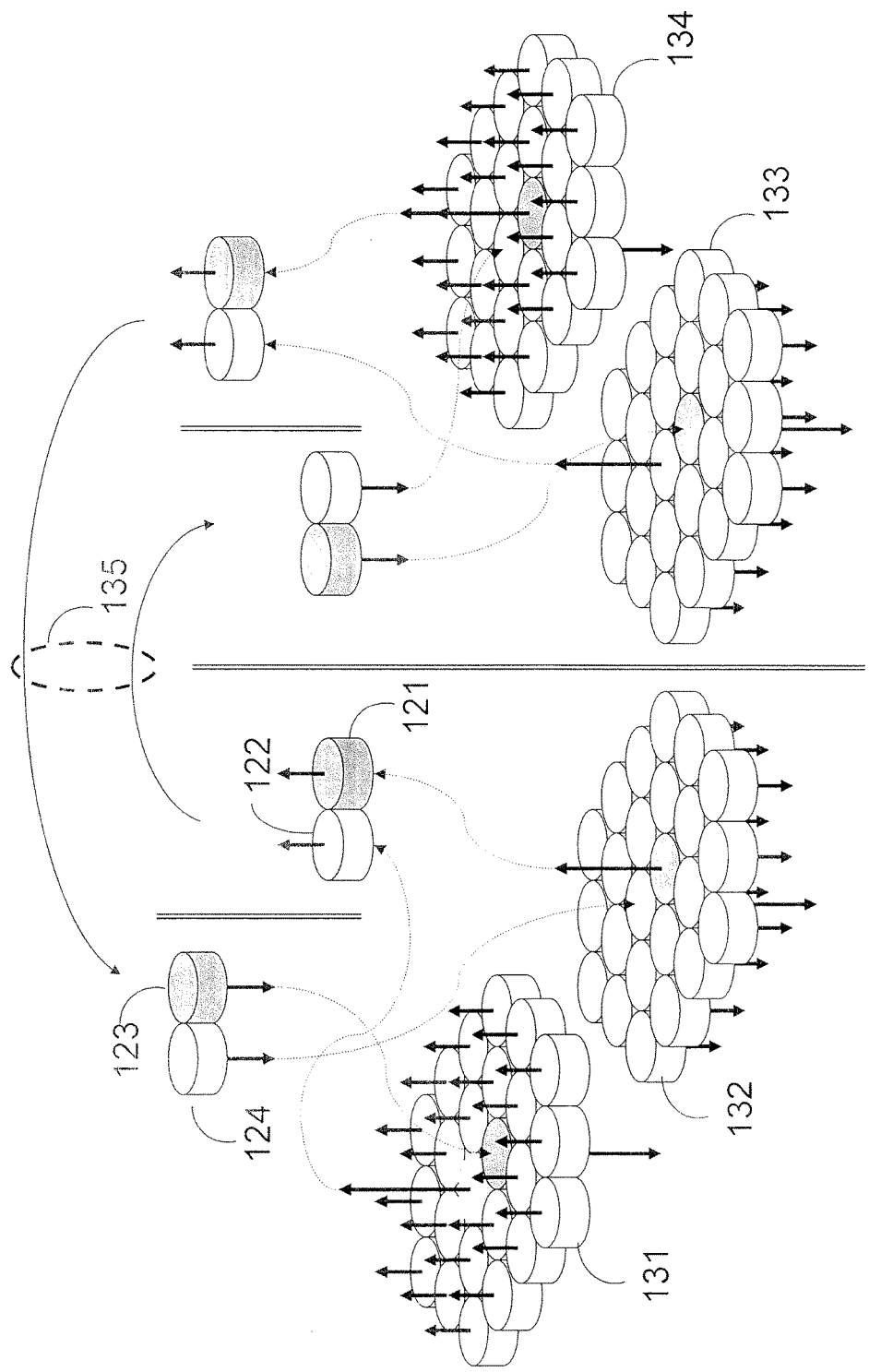
FIG. 13 is a diagram of the primary rings interleaved with the control loops.

FIG. 13 is a cross sectional diagram of the coupling between the control loops and primary rings at both ends of the craft. It shows sections of the control loops and primary rings with the magnitude and direction of their particles movement depicted by arrows. The control loops 131 and 132 accelerate the particles in the primary rings at one end and the control loops 133 and 134 decelerate them at the other to move the craft. At the accelerating end, the stream of electrons in the control loops 131 and 132 move opposite to the primary ring electron streams 123 and 121 respectively and parallel to its positron streams 122 and 124 respectively, at the accelerating end and in the opposite direction at the decelerating end. The dotted lines and arrows show how the rings combine as they traverse between the ends of the craft, with the arcing arrows 135 showing the direction of particle flow and connections between the primary rings at each end.

By surrounding the primary nanorings with parts of control loops, and balancing the current in both directions in the control loops as well as the primary nanorings, the stray electromagnetic energy is minimized with respect to changes resulting in accelerations and decelerations of the overall craft. FIG. 13 shows two halves of 22 control loops coupling to the two halves of each primary ring, with opposing streams of oppositely charged currents, such that the current in the control loops is moving opposite the current in the halves of the primary rings. The ratio of the number of control loops to primary rings, which may be more or less than shown in FIG. 13, as needed for the power transfer requirements, determines the amplification of the coupled current.

It should be noted here that the electrical and magnetic forces and aids between the primary rings differ significantly from normal currents, and may need to be separately analyzed for the straight and curved portions of the oval, because these charged particle streams are moving at relativistic speeds in electrically neutral nanotubes, as opposed to normal current, which consists of displaced electrons moving in an oppositely charged conductive medium.

The initial operation of the disclosed system is as follows: Inducing a current in one direction one side of the control loop, and an equal current in the opposite direction of the other side of the control loop, may be accomplished by flowing current in opposite directions through the lines differentially coupled to the control lines in the center of the craft as shown in 114, FIG. 11. This differential current initially induces a circular current in the control loop 111. In turn, the control loop current positively couples to the primary rings on one side, and negatively couples to the primary rings on the other side. Driving opposite relativistic currents through the top and bottom lines coupled to the control loop causes the Primary rings electron-positron pairs to accelerate at one end and decelerate at the other end, causing a continuous net shift of mass from one end of the craft to the other, resulting in an offsetting opposite movement of the craft itself.

In such an embodiment, the lateral forces in the primary and control rings cancel, because the particles in them are being equally accelerated and decelerated opposite to each other at the ends and middle of the respective rings. Rotational forces cancel because the particles in the primary rings and control rings are circulating in equal and opposite directions, which leaves the force of accelerating and decelerating the particles in the primary rings and the control rings. This produces motion in an apparatus of length L as follows: To transfer energy from one end of the craft to the other, the control rings have slower, higher density particle streams going from the positive coupled to the negative coupled end, and faster, lower density streams moving in the opposite direction. Since both skies of the control rings 111 in FIG. 11 are magnetically coupled together, their magnetic fields cancel, which adjusts the velocities and densities of the oppositely flowing currents so as to eliminate the differences in their relativistic momentum while transferring the energy from one end of the primary ring to the other.

On the other hand, currents in the primary ring are moving at relativistic speeds, which means the mass of the particles significantly change with small changes in velocity. The mass of the accelerated particles $Mx=M/[1-(V+dv)^2/C^2]^{1/2}$ is much greater than the mass of the decelerated particles $My=M/[1-(V-dv)^2/C^2]^{1/2}$. Since the differential velocity $dv$ is small, and the basic relativistic velocity V is large, the density of the particle streams changes far less than the mass of the particles change. As a result, over the length of straight portion of the oval there is a differential momentum approximately equal to $(Mx-My)V$. This differential momentum in one direction is offset by the apparatus or craft moving in the opposite direction.

In other words, energy is being constantly transferred between the primary and control loops, but, as can be seen in FIG. 16, the energy imparted to and from the control loop particle streams is primarily due to the change in velocity, with the corresponding density differences and magnetic coupling eliminating any differential momentum while transferring the energy from one end of the primary rings to the other. On the other hand energy imparted to and from the primary ring particle streams primarily changes the mass of those particle streams, not their velocities, resulting in little difference between the streams densities, thereby imparting the differential momentum between them to the craft.

The craft accelerates until the accelerated and decelerated streams of particles reach the other end of the craft, after which these initial forces balance, but the initial change also causes a continuous transfer of energy in the control loops from the decelerating end to the accelerating end of the craft. Since the energy taken from the decelerated stream equals the energy added to the accelerated stream of particles, there is no net energy lost in the primary rings, except what is distributed into a magnetic field induced by the control loop itself and the kinetic energy of the whole craft. The velocity of the craft and the control current continues to increase until the energy initially induced into the control loop is distributed between the magnetic field of the control loop and the motion of the craft. While a huge amount of energy is continually transferred through the control loops, very little of that energy is stored in the control loop's magnetic field because the cross sectional area of the control loop is extremely small, which limits the stored energy, so a large percentage of the induced energy is transferred into the kinetic energy of the craft. Some losses may occur in electromagnetic radiation due to the changing electromagnetic fields, but these will be small due to the limited distances between and characteristics of the primary rings.

After the acceleration and deceleration of the particle streams in primary rings stabilize, the forces again cancel, with the craft moving at a constant velocity. At that point, there should be no electromagnetic radiation because, the currents varying currents completely cancel, so there are no changes to the electromagnetic fields. The control loop will continue to transfer energy from the decelerating end and supply it to the accelerating end, of the craft as it continues its relativistic momentum transfer, and in a frictionless environment, the corresponding velocity will continue with no energy lost because the rings are all superconducting. On the other hand, if there is any leakage due to transmission inefficiencies or if there is any resistance due to air or other friction, it will require a constant flow of energy equivalent to these losses to maintain the craft's velocity.

This constant velocity can be determine by the net differential momentum moving opposite the velocity vector of the craft at any instant in time. If the craft is moving at a velocity, and the control current isn't changing, there is no acceleration, and the differential momentum is stable. The differential mass $M_d$ is moving at close to the speed of light so the differential momentum is $\sim M_d C$. Now if the mass of the craft is $M_t$, to the first order the velocity of the craft is simply $V_t = \sim M_d C/M_t$, because the resulting velocity is much less than the speed of light, and Newtonian calculations are a good approximation at non-relativistic velocities. The oval shown in FIG. 11 is the correct shape for this type of propulsion because most of the mass (Mx and My) is on the straight edges of the track, which is in the direction of movement, whereas in a circular structure, much of the mass is being accelerated or decelerated in a direction different than the direction of movement, reducing its effective differential mass by almost half.

As an additional current is induced throughout the whole control loop the streams or particles in the primary rings are accelerated to higher mass on one side of the ring and lower mass on the other side, the forces on the craft, which were initially balanced, become imbalanced, causing acceleration of the craft in the opposite direction to the transfer of differential momentum. Furthermore, this acceleration continues as energy is transferred by the control loop further decelerating the streams of particles at one end and accelerating them at the other until the energy originally induced into the control loop is either stored in the control loop's magnetic held or transferred into translational energy of the overall craft.

Movement up through a gravitational field may also be determined by the energy required for such movement. Absent other forces, the craft should rise to the level determined by the energy transferred to the craft. Conversely, decreases in velocity, or down through a gravitational field, may be obtained by extracting energy out of the control rings. Reducing the control current to zero should bring the craft to its initial velocity, or will reduce the energy of the object the craft has come in contact with.

The maximum velocity, or distance through a gravitational well may be determined by the amount of energy stored in the primary rings. The apparatus, e.g., craft's, velocity may be changed by increasing the acceleration and deceleration of the particle streams in the primary rings. At some point the velocity difference between the accelerated and decelerated rings becomes large enough to be offset by density changes in the particle streams, limiting further increases in velocity. In this manner the amount of relativistic mass contained in the primary rings prior to moving the craft determines the maximum velocity the craft can obtain.

Figure 14:
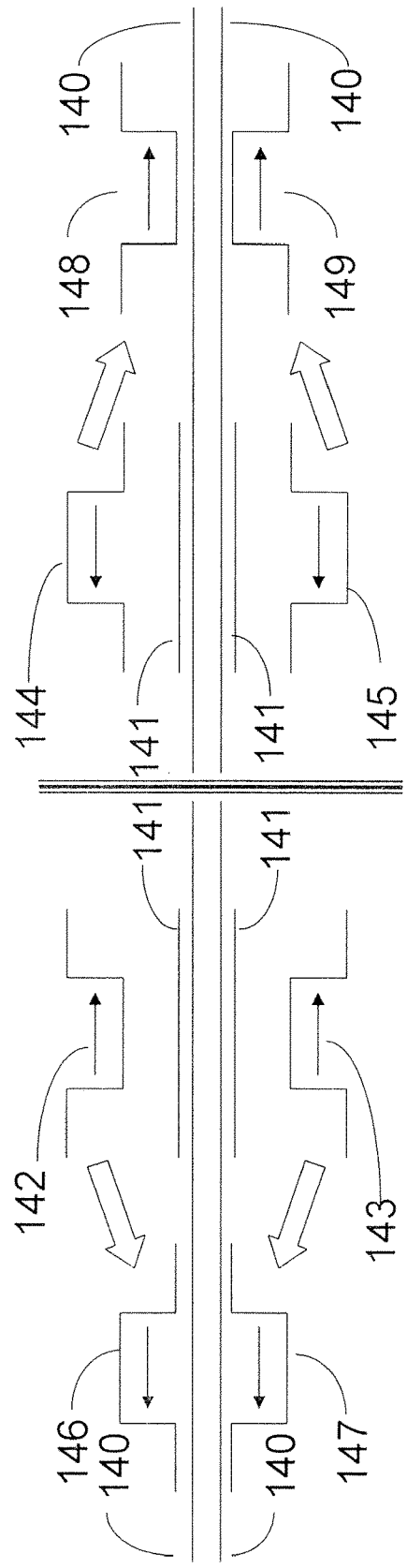
FIG. 14 is a diagram of the electrical pulses needed to accelerate the streams of particles in the primary rings.

In another embodiment of the invention, the control loops may be used to accelerate the streams of particles in the primary rings thereby increasing the relativistic mass of their particle streams. FIG. 14 shows that transmitting opposite polarity differential pulses 142,143 in one direction, followed by differential pulses 144,145 transmitted in the opposite direction, all on the lines 141 that are differentially coupled onto the control lines 140, creates two pairs of opposite polarity pulses 146,147 and 148,149 that travel from the middle of the control loops to both ends of the craft. At both ends the pulses will accelerate the particles in the primary rings. Each differential pulse cancels in the middle of each control loop, at their respective ends of loops, so they do not reflect back to the other end.

Figure 15:
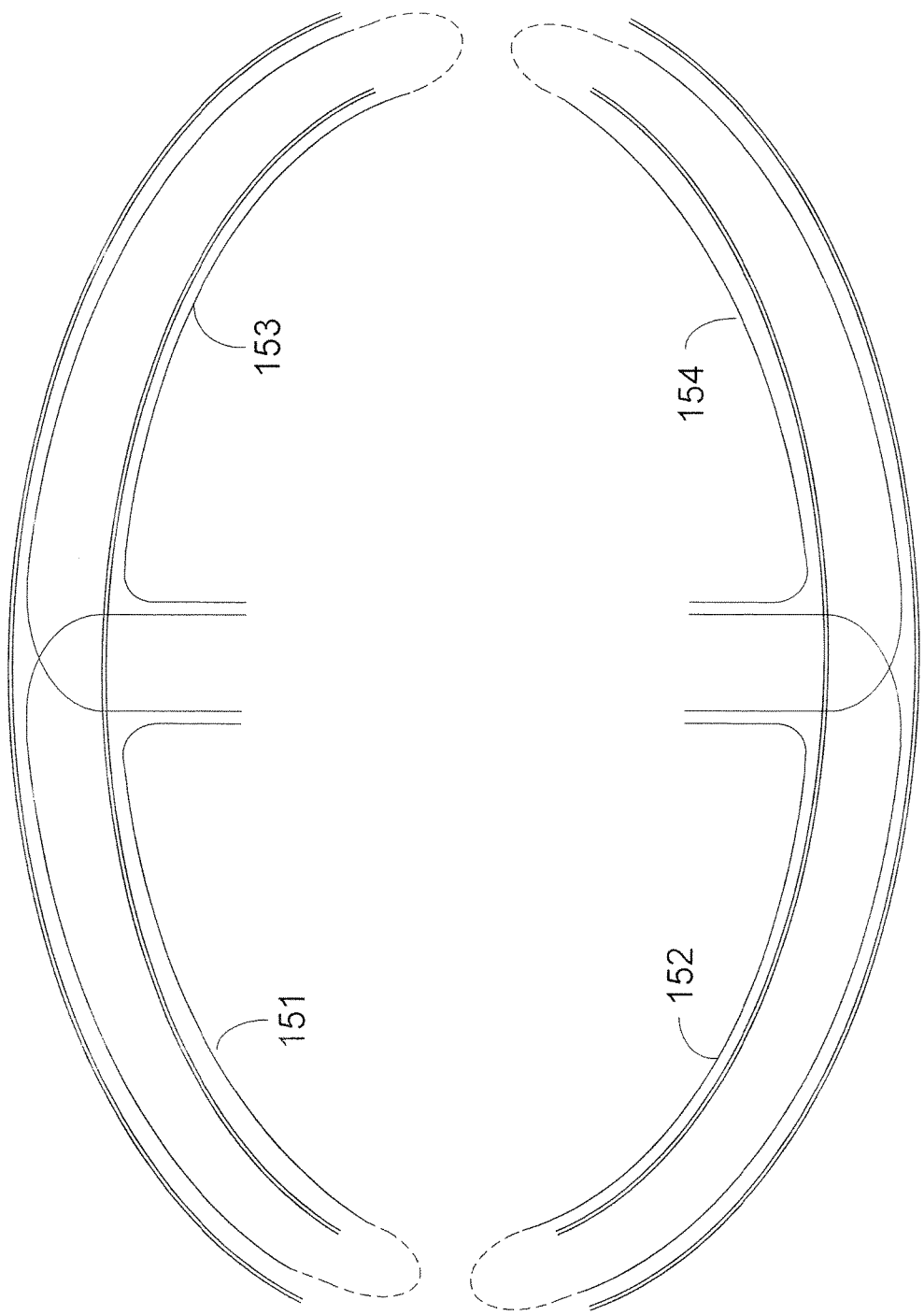
FIG. 15 is another diagram of the interleaved primary rings and control loops.

In yet another embodiment of the present invention, by offsetting the coupling of two or more portions of the control loops at the curved ends of the primary rings, turning the craft is merely a matter of using only one of these two or more control loops or inducing more current in some than others. The net effect is to move the craft more to the right or left, depending on which side has accelerated or decelerated the streams in the primary rings. In FIG. 15 the portions of control loops 151 and 152 are part of a connected control loop, as are portions of control loops 153 and 154, such that when more current is induced in control loop 151-152, the craft will turn toward the right and when more current is induced in control loop 153-154, the craft will turn toward the left, because the control loops introduce an imbalance between the portion of the primary rings that are accelerated in the clock-wise direction versus the portion of the primary rings that are accelerated in the counter-clockwise direction. This imbalance results in the craft rotating in the direction opposite the imbalance.

It will be appreciated by persons skilled in the art that the present invention is not limited by what has been particularly shown and described hereinabove. Rather the scope of the present invention includes both combinations and sub-combinations of various features described hereinabove as well as modifications and variations which would occur to persons skilled in the art upon reading, the foregoing description and which are not in the prior art.

I claim:

1. A propulsion apparatus for moving a craft, including:
   at least one first pair of primary rings, each containing a stream of electrons circulating at relativistic speed, wherein the streams of electrons in the respective primary rings of the first pair of primary rings circulate in opposite directions to each other; and
   at least one second pair of primary rings, each containing a stream of positrons, each circulating at relativistic speed, wherein the streams of positrons in the respective primary rings of the second pair of primary rings circulate in opposite directions to each other;
   wherein each of said primary rings of said at least one first pair of primary rings and said at least one second pair of primary rings consists of two straight tubes, each coupled to first and second curved tubes at respective first and second ends of each of said straight tubes; and
   wherein said propulsion apparatus is configured to move by accelerating said streams of electrons and said streams of positrons through said first curved tubes and decelerating said streams of electrons and said streams of positrons through said second curved tubes.

2. The propulsion apparatus as in claim 1, wherein each of said at least one first pair of primary rings contains a first and a second ring of each respective pair of said at least one first pairs of primary rings, and wherein each said at least one second pair of primary rings contains a first and second ring of each respective pair of said at least one second pairs of primary rings, wherein the streams of electrons in said first rings of each of said at least one first pair of primary rings and the streams of positrons in said first rings of each of said at least one second pair of primary rings all circulate in a first direction, and the streams of electrons in said second rings of each of said at least one first pair of primary rings and the streams of positrons in said second rings of each of said at least one second pair of primary rings all circulate in a second direction, wherein said first direction is opposite said second direction, and wherein said straight tubes of said first rings of said at least one first pair of primary rings are electrically coupled to said straight tubes of said first rings of said at least one second pair of primary rings, said straight tubes of said second rings of said at least one first pair of primary rings are electrically coupled to said straight tubes of said second rings of said at least one second pair of primary rings, said curved tubes of said first rings of said at least one first pair of primary rings are magnetically coupled to said curved tubes of said second rings of said at least one second pair of primary rings, and said curved tubes of said second rings of said at least one first pair of primary rings are magnetically coupled to said curved tubes of said first rings of said at least one second pair of primary rings.

3. A propulsion apparatus as in claim 1, including at least one control loop, wherein said at least one control loop is configured to accelerate said streams of electrons in said first curved tubes of each of said at least one first primary ring, and to accelerate said streams of positrons in said first curved tubes of each of said at least one second primary ring and to decelerate said streams of electrons in said second curved tubes of each of said at least one first primary ring, and to decelerate said streams of positrons in said second curved tubes in each of said at least one second primary ring by electrically coupling said streams of electrons and said streams of positrons with streams of electrons in said at least one control loop.

4. A propulsion apparatus as in claim 3, wherein said streams of electrons in said at least one first pair of primary rings and said streams of positrons in said at least one second pair of primary rings are accelerated to relativistic speed by issuing sets of electrical pulses coupled into said stream of electrons within said at least one control loop in synchronization with the speed of said streams of electrons in said at least one first pair of primary rings and said streams of positrons in said at least one second pair of primary rings.

5. A propulsion apparatus as in claim 1, including at least two control loops; wherein a first of said at least two control loops is configured to accelerate said streams of electrons from a center of said first curved tube to the first end of a first of the two connecting straight tubes in at least one first pair of primary rings, to accelerate streams of positrons from the center of said first curved tube to the first end of a first of the two connecting straight tubes in at least one second pair of primary rings, to decelerate said streams of electrons from a center of said second curved tube to the second end of said first of the two connecting straight tubes in at least one first pair of primary rings, and to decelerate streams of positrons from the center of said second curved tube to the second end of said first of the two connecting straight tubes in said at least one second pair of primary rings, by electrically coupling to said stream of electrons in said first of said at least two control loops; and wherein a second of said at least two control loops configured to accelerate said streams of electrons from the center of said first curved tube to the first end of a second of the two connecting straight tubes in said at least one first pair of primary rings, to accelerate streams of positrons from the center of said first curved tube to the first end of a second of the two connecting straight tubes in said at least one second pair of primary rings, to decelerate said streams of electrons from the center of said second curved tube to the second end of said second of the two connecting straight tubes in said at least one first pair of primary rings, and to decelerate streams of positrons from the center of said second curved tube to the second end of said second of the two connecting straight tubes in said at least one second pair of primary rings, by electrical coupling to said stream of electrons in said second of said at least two control loops, thereby turning said craft when inducing a different currents respectively into each of said at least two control loops.

6. A propulsion apparatus as in claim 5, wherein said primary rings of said at least one first pair of primary rings and at least one second pair of primary rings and said at least two control loops are composed of hydrocarbon nanorings.

7. A propulsion apparatus as in claim 6, wherein said hydrocarbon nanorings form radial dipole fields sufficient to contain said streams of electrons within said at least one first pair of primary rings and to contain said streams of positrons within said at least one second pair of primary rings and said streams of electrons in said at least two control loops.

* * * * *